United States Patent [19]
Gimenez

[11] Patent Number: 5,451,157
[45] Date of Patent: Sep. 19, 1995

[54] MACHINE FOR MANUFACTURING OBJECTS MADE OF PLASTIC MATERIAL BY MEANS OF THERMOFORMING

[76] Inventor: Carlos M. Gimenez, Calle 28, Nro. 3697, San Martin, Provincia de Buenos Aires, Argentina

[21] Appl. No.: 157,934

[22] Filed: Nov. 24, 1993

[30] Foreign Application Priority Data

Nov. 26, 1992 [AR] Argentina .................. 323.760
Nov. 4, 1993 [AR] Argentina .................. 323.208

[51] Int. Cl.$^6$ .............. B29C 51/10; B29C 51/22; B29C 51/42
[52] U.S. Cl. .................. 425/302.1; 425/122; 425/387.1; 425/388; 425/395; 425/403.1; 425/437; 425/453; 425/DIG. 201; 264/297.6
[58] Field of Search .............. 425/122, 292, 302.1, 425/387.1, 395, 398, 400, 402, 403.1, 437, 388, DIG. 201, 453, 553; 264/297.6, 297.8, 320

[56] References Cited

U.S. PATENT DOCUMENTS 3,837,782  5/1974  Meissner et al. ......... 425/DIG. 201
4,057,382 11/1977  Yamamori ................ 425/387.1
4,086,046  4/1978  Brown et al. ............ 425/361
4,360,334 11/1982  Kiefer .................. 425/387.1
4,608,009  8/1986  Whiteside et al. ....... 425/388
4,740,342  4/1988  Menard et al. .......... 425/388
5,167,969 12/1992  DeMaio, Jr. et al. ..... 425/388

*Primary Examiner*—Khanh Nguyen
*Attorney, Agent, or Firm*—McGlew and Tuttle

[57] ABSTRACT

Thermal forming of objects made from plastic material if performed by machine which has first, second and third sectors. The first sector includes structure for unrolling a coil of plastic sheet material. The second sector receives and transports the plastic sheet from the first sector and also heats the plastic sheet as it is moved through the second sector. In the third sector, there is a rotating die which has a plurality of die faces. Each of the die faces is an object form. A first stage of the rotating die receives the heated plastic sheet from the second sector and deforms the heated plastic sheet around the object form to create the object shape. A second stage of the third sector cools the deformed plastic and removes the object from the die faces.

19 Claims, 6 Drawing Sheets

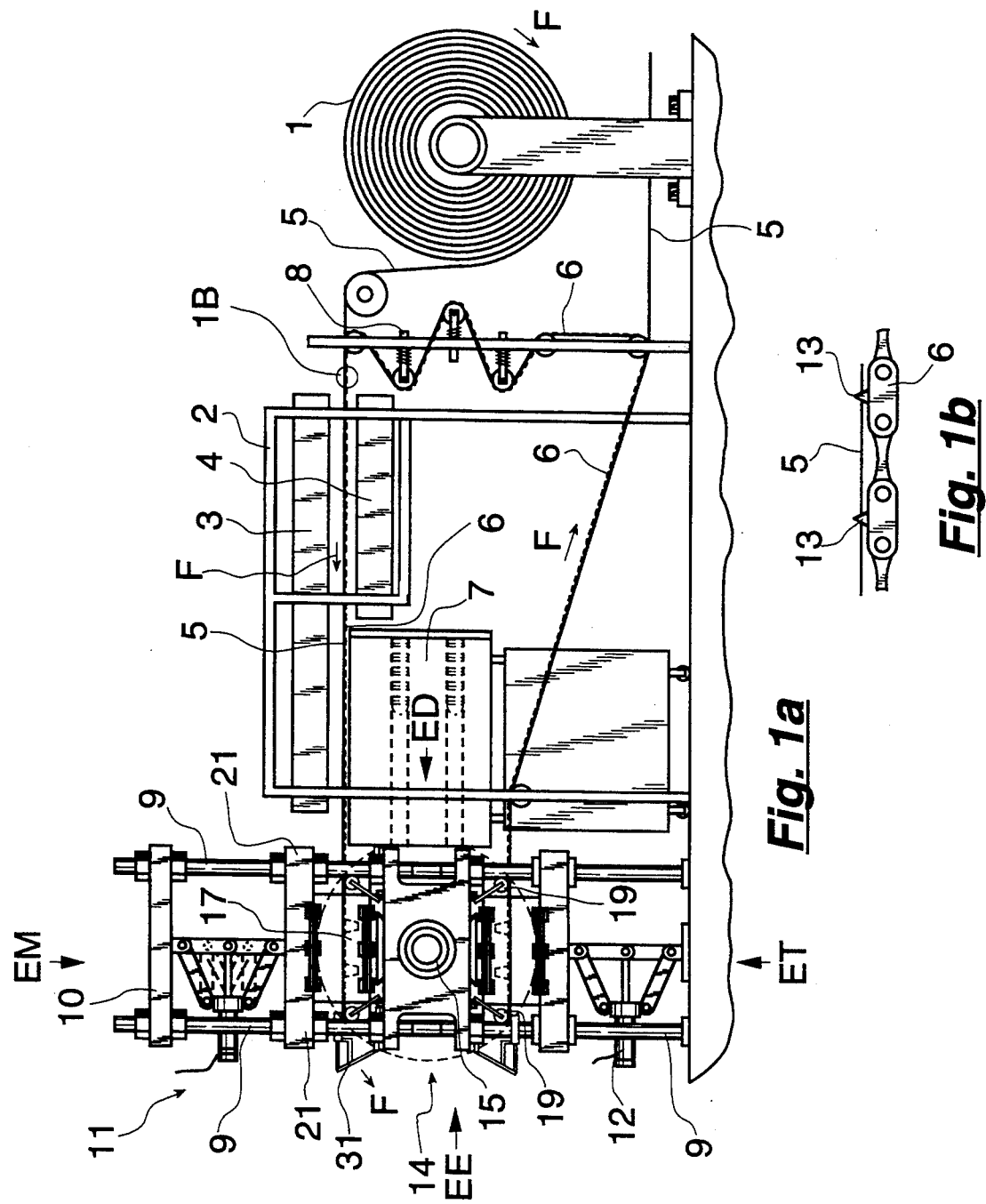

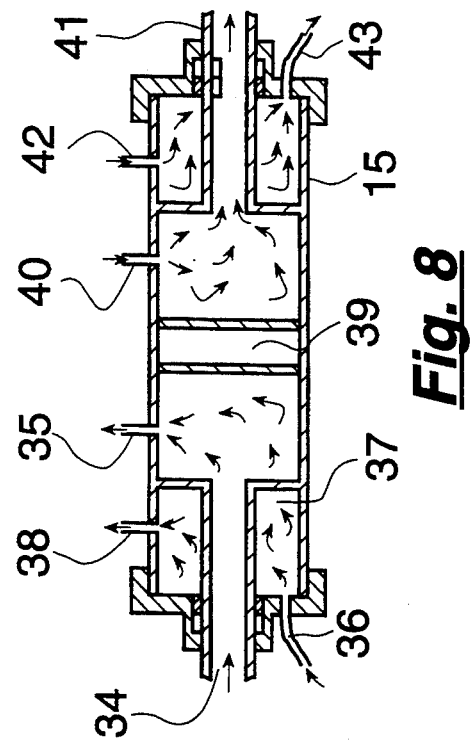
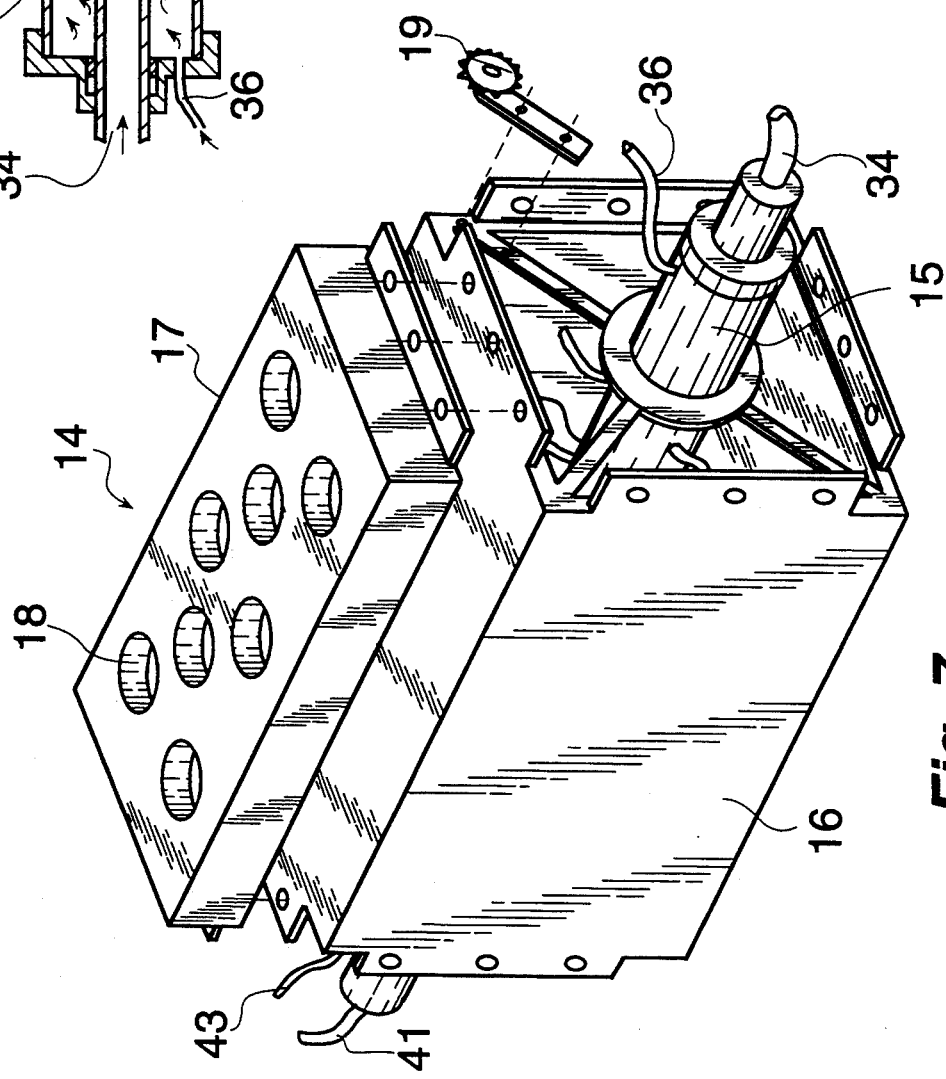

MACHINE FOR MANUFACTURING OBJECTS MADE OF PLASTIC MATERIAL BY MEANS OF THERMOFORMING

FIELD OF THE INVENTION

The principal object of the present patent of invention is a machine for manufacturing objects made of plastic material by means of thermoforming, especially those objects that can be discarded immediately after their use, such as glasses, bowls, wide-mouth containers for foods and the like. The present invention presents, as a novelty, a special means for holding dies, by means of which it is possible to simultaneously carry out various stages of the manufacturing process that the machine performs.

More specifically, the present invention protects a machine of the type indicated in the above paragraph, whose structural characteristics are clearly distinguishable from other machines of the same purpose, and as a result, the machine leads to an increase in the production capacity by simultaneously carrying out various stages of the manufacturing process.

BACKGROUND OF THE INVENTION

Other machines for manufacturing objects made of plastic material by means of thermoforming are known. In general, they are machines which have a coil containing a continuous sheet of plastic material, which is pulled in order to make it pass through a heating zone which is determined by suitably arranged heating furnaces; then, under these conditions, the sheet is made to face a performing and molding zone, where it is inserted between preformed components which face respective forming dies for molding. These prior-art machines then operate by cooling, die-forming and subsequent removal and expulsion of each of the thermoformed objects from the die.

These functions, which are known per se, are carried out by the majority of the prior-art machines, of which basically two types can be determined, namely:

a) Those in which, at the same station, where the forming of the object is carried out, the die-forming of the object is also carried out at the same time, in order to then send the object, by means of various mechanisms, to the "stacking" space, called the "stacking station".

Although these machines are ever efficient, they are limited in their production capacity. In fact, this limitation lies in the fact that, once the objects are thermoformed, they remain in their dies or molds during the die-forming and cooling stages, with the plastic material machine remaining stopped until the expulsion process ends, immediately after which the molds are newly set up to receive a new section of continuous sheet which is capable of starting a new forming process. As a result, the capacity of the machine is limited by the number of openings per die, presenting disadvantages when the die has more than three thermoforming rows (amounting to the number of openings in a line that the die has for "rows"). This disadvantage lies in obvious imprecisions in accuracy. The extraction of the already thermoformed and die-formed objects presents a high rate of rejection. For this reason, dies with, for example, 48 openings may not be used.

b) Other prior-art machines are those in which the thermoforming is produced in one station and the die-forming is performed in another subsequent station in order to then remove from the mold and stack the objects which are already formed and die-formed at this same station, at another subsequent station or outside of the system.

In this case, the machine uses a set of two dies: one die for thermoforming and another die for die-forming; molding is performed in the first station, and die-forming is performed in the second station. The advantage in this case is that dies with three or more rows can be used. It so happens that the molded objects, still without die-forming, leave the molding die to enter the die-forming die, and imprecisions in the die-formed edges of the objects are produced there, which lead to rejection.

In addition to that mentioned above, the disadvantage which is prominent in both cases is the limitation of production which causes delay times in the machines in each of the "stations" stages of the process. In fact, the stations consist of 1) the time for feeding the continuous sheet until it is arranged in the thermoforming and molding sector; 2) the preforming time; 3) the thermoforming time; 4) the delay time during the process for cooling the molded objects; 5) the time which passes for the die-forming; 6) the time which passes for the expulsion of the pieces and their stacking. Once all of these stages have elapsed, the machine is then again able to start a new cycle.

SUMMARY OF THE PRESENT INVENTION

The device, which is the reason for the present application, is based on a system that is integrated by a die-holding wheel and a central axis of rotation which, when combined, produce the desired effect, which is specified as follows: the wheel begins to rotate on its axis at a predetermined moment and coinciding with the position of the material, in the form of a sheet, on the die, with its entry, a vacuum and/or air valve is activated, which causes the material superimposed on the die to be suctioned and/or compressed (respectively) against the die, the material thus receiving a new shape.

As the wheel rotates, the die passes through various stations, namely: 1) molding sector (defined in the above paragraph); 2) cooling station, the water enters through an opening to the cold water chamber 106, which is connected to the cooling inlet of the die A, this is a continuous process with the object as the die is always cold; 3) when the piece formed recovers its rigidity, and it is ready to be removed from the mold, a device is operated which disconnects the vacuum and/or air and/or compression valve, actuating the valve 105 which permits the air, to bring about the expulsion of the formed piece. A die-forming system can be linked up in this station in order to separate the formed piece form the rest of the plate, or else the same may be connected at another pint (inside or outside of the machine) with the above-mentioned object. To solve the above-mentioned disadvantages, the machine according to the present patent of invention has a principal operational advantage, the feature that it is not necessary to delay the ending of one cycle before beginning with the next cycle. That is, the machine according to the present invention is equipped to carry out all of the stages of the process simultaneously, without delay times between stages.

This principle of operation can be put into practice as a result of the structural characteristics of the machine according to the present invention which stands out because it includes a rotary die. This rotary die is located obliquely to the feed direction of the machine and has preferably at least four die-holding faces which are identical to one another and are formed to face, in succession, the means or stages which are involved in the process that the machine carries out. Under these conditions, the above-mentioned simultaneity of the operations is performed while the dies arranged on one of the faces of the die-holding rotor are in the operation of thermoforming the objects, the dies arranged on the subsequent face make it possible to carry out the process for cooling these objects which were molded in the previous stage; simultaneously, on the next face, the die-forming of the already cooled objects is carried out; simultaneously, on the next die-holding face, the expulsion operation is carried out for the stacking of the formed objects.

As a result of that mentioned above, it arises as the principle advantage that the number of openings of the dies does not have any effect on the cut or die-forming of the objects, and that the above-mentioned stages of thermoforming, cooling, die-forming and expulsion for stacking are completely independent from one another, which is why it is possible to carry out these stages simultaneously, leading to a great increase in the production capacity of the machine.

In order to express in concrete terms the advantages thus superficially mentioned, to which the users and experts in the field may add many more, and to facilitate the understanding of the structural, constitutive and operational characteristics of the machine according to the present invention, a preferred exemplified embodiment is described below, which is shown schematically and without a set scale on the attached sheets, with the express clarification that, precisely because it involves an example, it is not suitable to assign to same a limiting or exclusive nature beyond protecting the present patent of invention, but it is simply for the purpose of explaining or illustrating the basic concept on which the present invention is based.

BRIEF DESCRIPTION OF THE DRAWINGS In the drawings:

FIG. 1a is a lateral, schematic view of the machine according to the present invention.

FIG. 1b is an enlarged view of the area indicated by 1B in FIG. 1a.

FIG. 7 is a schematic view in perspective which shows the most prominent outer components of the rotating die.

FIG. 8 is a schematic longitudinal section of the cylindrical tubular chamber axial to the axis of rotation of the above-mentioned die-holding rotor according to the present invention.

In all the figures, the same or equivalent parts or structural components of the assembly correspond to the same reference numbers, according to the example selected for the present explanation of the machine according to the present invention.

DETAILED DESCRIPTION OF THE PREFERRED EMBODIMENT

Figure 6:
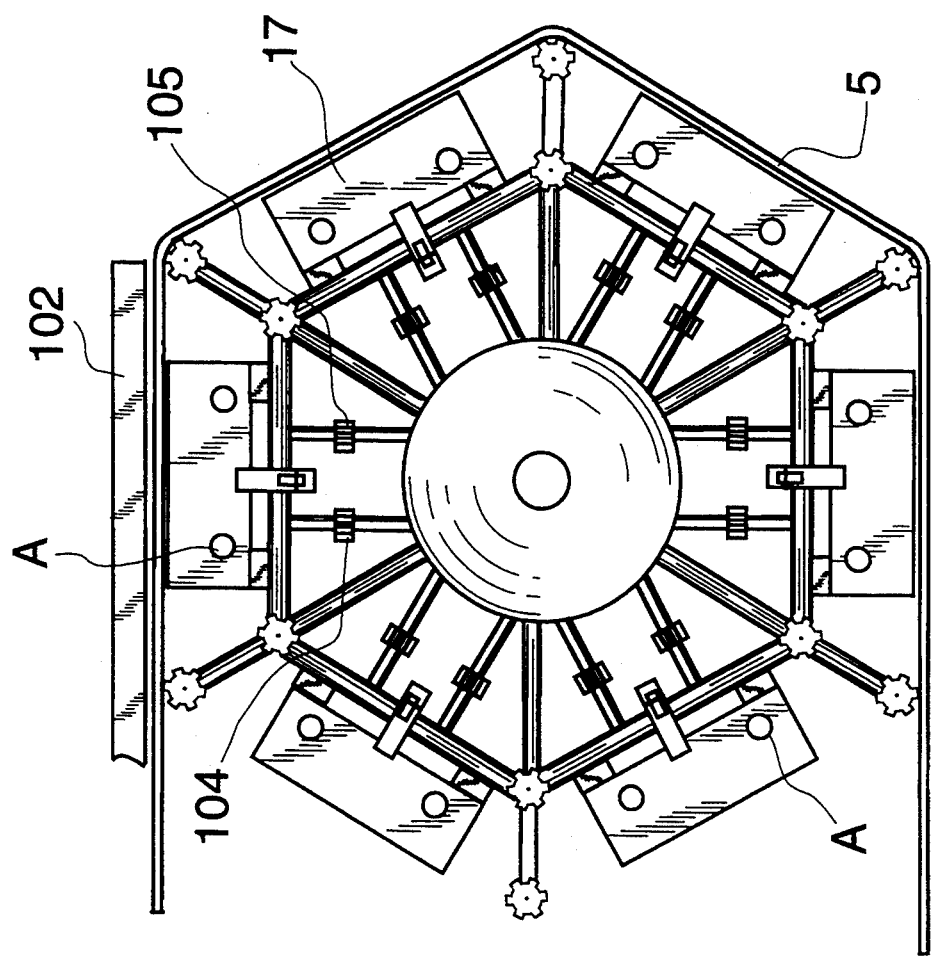
FIG. 6 is a cross sectional view of a rotating die having six die faces.

As can be seen in FIG. 1, the machine according to the present invention can be analyzed by evaluating three zones or sectors. The first sector is a feeding sector, in which is located a coil 1 of a continuous sheet of hard plastic material, with a certain thickness, such as those which are used to manufacture various objects which are light-weight and may be discarded after use. The second sector is an intermediate sector consisting of a frame 1, which supports the furnaces 3 and 4 for heating the plastic sheet 5, as well as the lateral pulling chains 6, the collecting means 7 for stacking the objects obtained, and the means 8 for tensioning the 6. The third sector, which is where the dies operate, is formed by a frame mounted on four columns 9, which are connected to one another by crosspieces 10, in which the die-holding rotor device is located.

It is noted that the driving means, which produce the rotation of the die-holding rotor, the displacements of the stacking collector, and the movements of the hydraulic cutters 11 and 12, are not shown, nor are the means which produce the circulation of cooling water and the pneumatic suction and expulsion circuits which the machine uses for its various operations. The control means, which synchronize and arrange the movements is also not shown. These means may be substituted with several different types of equivalent means, and are illustrated and explained for understanding the advantages and operations of the structural solution, which is the reason for the present patent of invention.

As is seen in FIG. 1, the continuous sheet 5, for its feed, is pulled by lateral pulling barbs 13 capable of perforating the sheet in its lateral edge zones. The pulling chains 6, which are pulled by the die-holding rotor by means of the gear 19, in its endless course, pass through a section, in which are located tensioning means 8, with which it is assured that the chain maintains its gear position and it linking with the sheet in any of the positions that the die-holding rotor device adopts (see FIGS. 3 and 4).

As stated above, the continuous sheet 5, immediately after passing through the heating furnaces 3 and 4, is, under the conditions of heat, able to act as raw material for the thermoforming of objects. For this purpose, by means of pulling, it enters the third sector of the machine, facing the molding station, indicated by the reference E.M. Once the mold is produced by thermoforming (as is explained below), the die-holding rotor and a first sheet section, which was sent to the station, advance, rotating about the axis 15 of rotor 14 to now face the cooling station E.E. Simultaneously, a second section of sheet, which then follows, will face the above-mentioned E.M. molding zone. Once the cooling has occurred, a new rotation of the rotor 14 and feeding of the sheet 5 is produced. The first section of the sheet now faces the die-forming station E.T., where the objects or pieces already thermoformed with the sheet 5 are removed. This continues with the chain in its discard position, and the pieces thermoformed within the die are now die-formed or cut away. Also simultaneously, the following sheet sections of sheet 5, face the respective, previous stations. Finally, when the last rotation of the rotor or rotating die 14 is produced, its cycle ends in the station E.D. which consists of removing from the mold and expulsion. In this section of the process, the thermoformed and die-formed objects are removed from the die and are deposited in the stacking means 7. In the meantime, the sections of sheets 5, which follow behind, are sent into the respective stations that they face.

Figure 3:
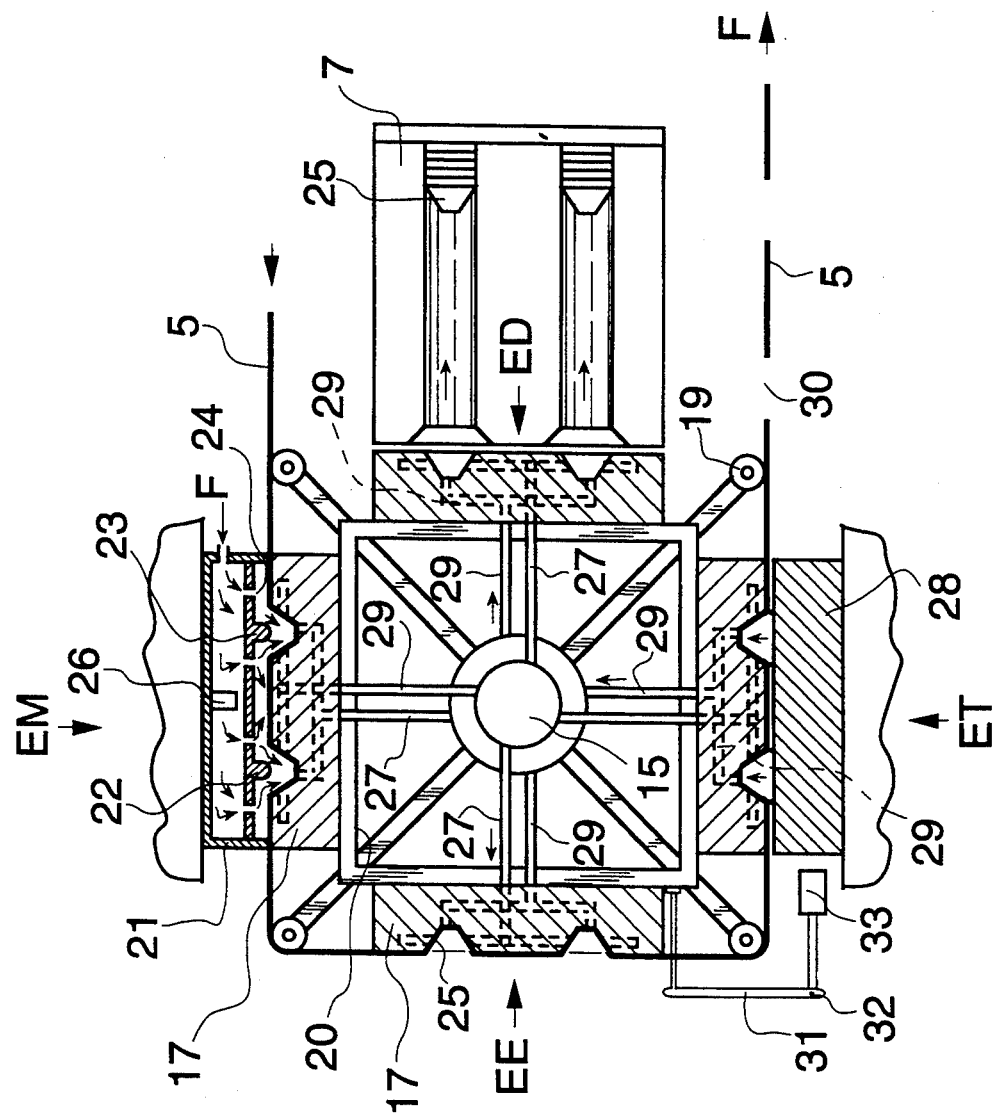
FIG. 3 is a cross-sectional view of the die-holding rotor device, in the operating position, according to the present invention.

The operational advantages that arise from the simultaneity of operations which the machine according to the present invention carries out, are a direct result of the creation of the novel die-holding rotor 14, which must have the following basic structural characteristics. As is seen in FIG. 3, the rotor 14 has, on its periphery, four faces 16 which are identical and parallel two by two, defining a die-holding cube 20, on which faces are detachably arranged female dies 17, which can have as many openings 18 as desired by the owner according to the number of objects that he wishes to manufacture and the desired production of the machine. The bores 16 are shared in common and are linked with the axis 15 of the rotor 14, which is cylindrical and hollow, and which is appropriately mounted in the columns 9 in order to be arranged in a position of rotation in the direction F indicated in FIGS. 1, 3, and 4. In the proximities of its end vertices, the die-holding rotor 14 has guides 19 of the gear type with teeth which embed in the chain, and while being fixed to the die-holding rotor, they are pulled with its own revolving motion.

In the molding station E.M. fluid can either be withdrawn from the duct 29 to deform the hot plastic sheet 5 or a hydraulic cutter 11 can be used.

Figure 4:
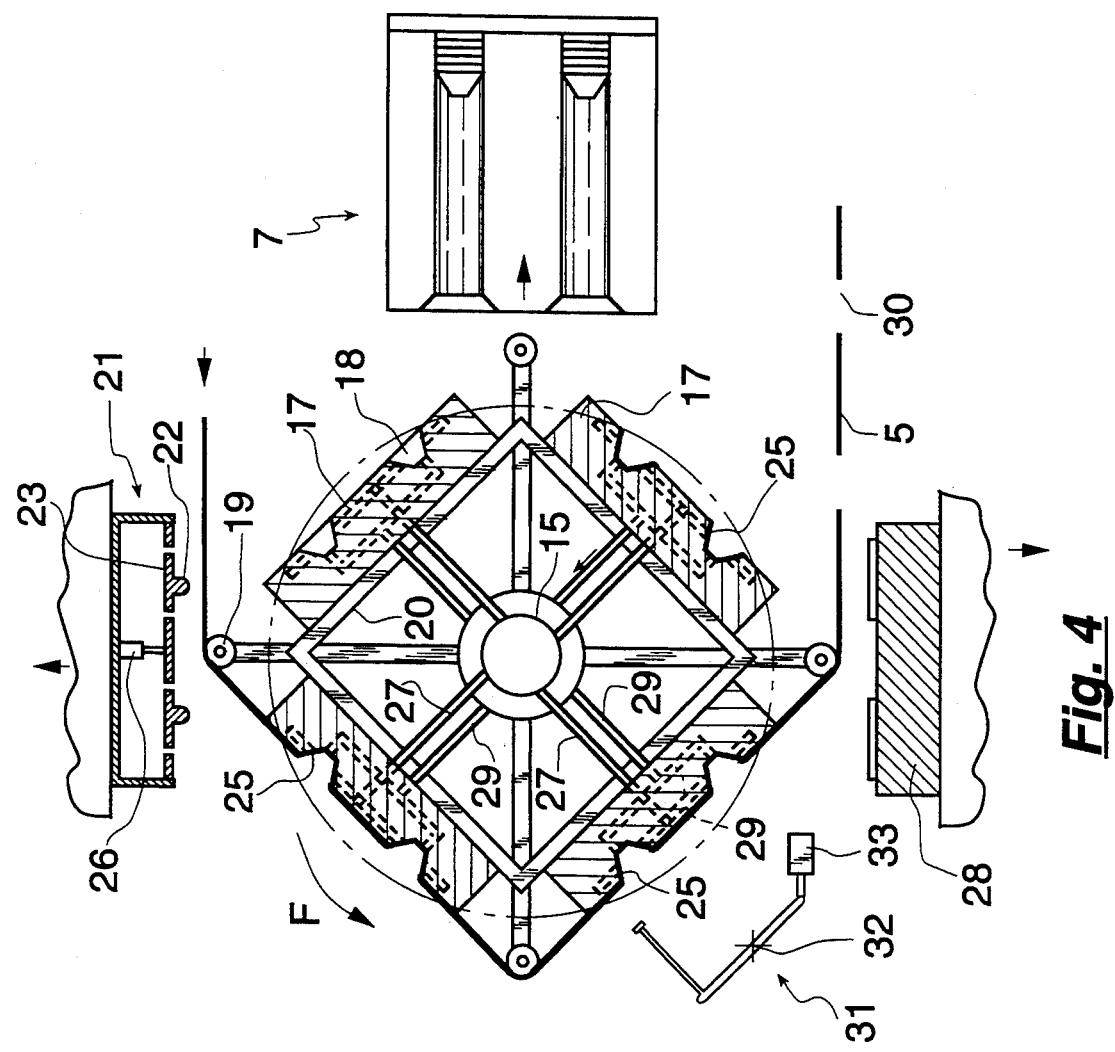
FIG. 4 is another cross-sectional view similar FIG. 3, but with the die-holding rotor device in an intermediate position when it rotates to change position.
Figure 5:
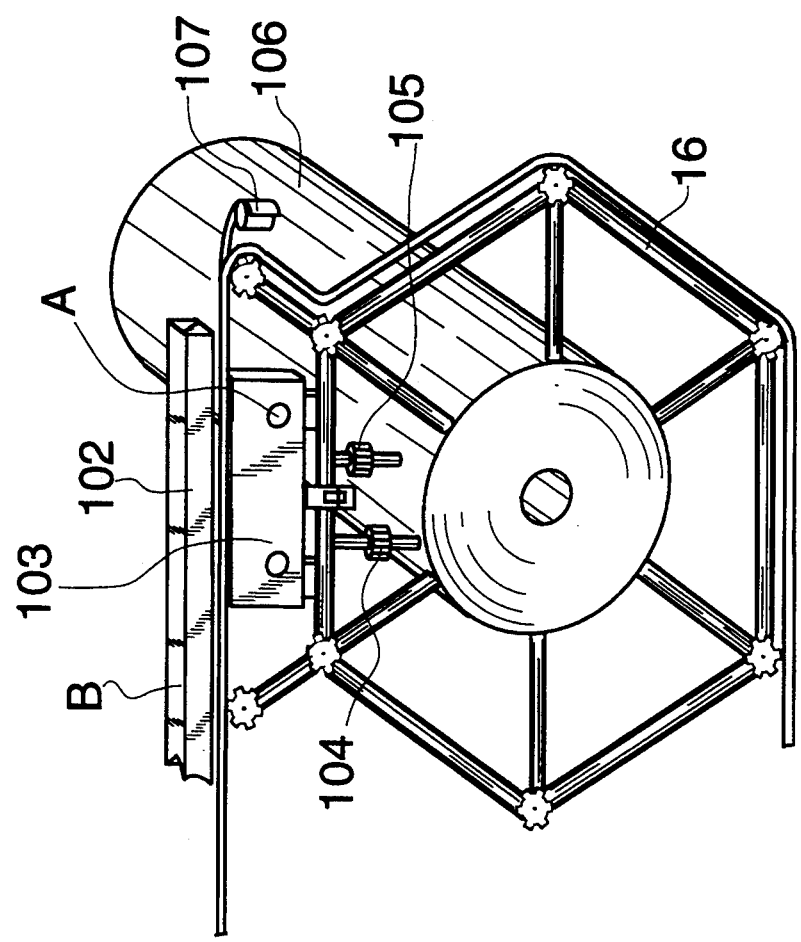
FIG. 5 is a perspective view of the rotating die.

The hydraulic cutter 11 with the male or punch die 21, which, with its preformed sections 22, faces the continuous sheet 5 and together with the openings 18 of the female die 17 carries out the preforming of the objects 25. FIGS. 3 and 4 show in great detail the presence of the pneumatic cylinder 26 which produces, in a coordinated manner, the feed of the preformed sections 22 which are defined in a plate 23 which has openings 24 for the inlet of air in the direction of the openings 18 which give definitive formation to the objects 25. When the hydraulic cutter 11, which controls the displacement of the male die 21, is contracted, then the rotor 14 can rotate ¼ of a turn to proceed in the cycle (FIG. 4).

In the cooling station E.E., the objects 25 remain in their molds, still linked with the sheet 5 (see FIGS. 3 and 4). A cooling liquid is introduced by means of the inlet ducts 27 and valves 104 and is made to circulate in the body of the die 17, a cooling which is transferred to the objects 25. The liquid exits by another similar duct (not shown) towards the interior of the cylindrical axis 15, which can be seen in FIG. 8.

Figure 2:
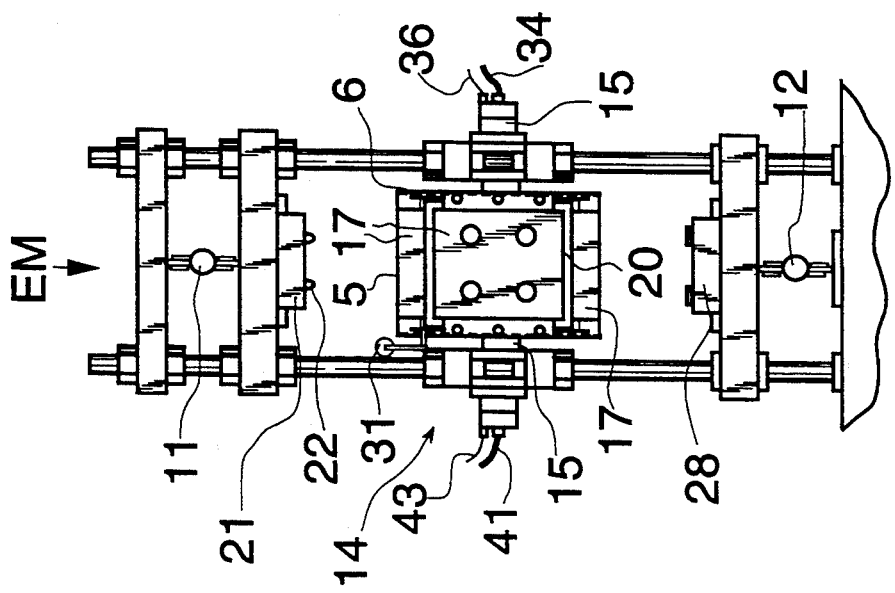
FIG. 2 is a front view of the machine which shows the second stage where one of the die faces operate.

In the die-forming station E.T. (FIGS. 2 and 3), when the hydraulic cutter 12 is in its position of maximum expansion, the die-forming die produces the cut and separation of the objects 25 from the sheet 5, and simultaneously, a pneumatic suction is performed by the ducts 29 and valves 105 on the objects 25, which keeps them held in the respective openings of the female die 17. It can be seen in these figures that the continuous sheet 5, in its outlet section in the direction of discard, has die-formed openings 30.

In the station for removal from the mold and stacking E.D., the female die 17 faces the stacking device 7. In this case, pneumatic pressure is sent via the duct 29 and valve 105, and used for the removal and expulsion of the objects 25 from the mold and for assembling the objects in stacks. For this purpose, the stacking device 7 has means which produce displacements which are synchronized with the rotation of the die-holding rotor 14. These means are arranged in mutual contact with the die 17 when the rotor is in the operating position (FIG. 3), and then displaced in order to make it possible to move same when the rotor rotates ¼ of a turn (FIG. 4).

In order to ensure the correct facing of the dies 17 with the means which are faced at each station, it is advantageous to use positioning means such as those indicated by reference number 31 in FIGS. 3 and 4. In the case shown, the positioning means consist of rocker arms which rotate with respect to an axis 32 by means of a hydraulic cylinder 33. In the position in FIG. 3, the positioning means is arranged with the rotor in its exact position, while in the position in FIG. 4 (the means) are open in order to allow passage when the rotor 14 is rotated. The machine can use pairs of these positioning rocker arms since they may be located on adjacent faces 16 or opposing faces 16.

In FIG. 6 it can be seen schematically how the distribution of air and water, which are use din the various processes described above, is organized in the interior of the cylindrical axis 25. The cold water inlet, which is linked by the connector 35 with the cold water inlet duct 27 to the die 17, is indicated by the reference 34. The inlet of air to the interior of a chamber 37, which by means of the outlet 38 is linked with the duct 29 for each die 17 in order to produce the pneumatic expulsion of the objects 25, is indicated by the reference 36. Also included are a heat-insulating chamber 39 and the outlet ducts 40 and 41 for the hot water immediately after its cooling action, as well as the ducts 42 and 43 which, linked with the above-mentioned duct 29, produce, in the corresponding station, the suction action by means of a pneumatic pump (not shown).

What is claimed is:

1. A machine for thermoforming plastic objects, the machine comprising:
   a first sector including means for unrolling a coiled plastic sheet;
   a second sector positioned adjacent said first sector and including means for receiving and transporting the plastic sheet from said first sector and through said second sector, said second sector also including furnace means for heating the plastic sheet as the plastic sheet passes through said second sector;
   a third sector including a rotating die having a plurality of die faces, said plurality of die faces defining an object form, said rotating die having means for receiving the heated plastic sheet from said second sector and for holding the heated plastic sheet against said plurality of die faces, said rotating die having a first stage which first receives the heated plastic sheet from said second sector, said first stage having molding means for deforming the heated plastic sheet around said object form into an object shape when said die faces are rotated into said first stage, said third sector also including a second stage receiving said die faces from said first stage and for cooling the object shape, said third sector also including a third stage receiving said dies faces from said second stage, said third stage having removal means for removing said object shape from said die faces, said third stage passing said die faces to said first stage after the object shape is removed.

2. A machine in accordance with claim 1, wherein:
   said rotating die defines an interior cooling space, said interior cooling space having a cooling inlet means for receiving cooling fluid, said interior cooling space having cooling passages which lead the cooling fluid from said cooling inlet means to said plurality of die faces, said interior cooling space also having a cooling exit means for discharging the cooling fluid from said interior cooling face.

3. A machine in accordance with claim 2, wherein:
said cooling inlet and exit means are positioned along an axis of rotation of said rotating die.

4. A machine in accordance with claim 1, wherein:
said rotating die includes a pressure passage means leading to said object form on said die faces, said pressure passage means for guiding pressurized fluid to and away said object forms.

5. A machine in accordance with claim 4, wherein:
removal means of said third stage supplies pressurized fluid to said pressure passage means for guiding the pressurized fluid to said object form of said die faces in said third stage for expelling said object shape from said object form.

6. A machine in accordance with claim 4, wherein:
said pressure passage means includes a pressure connector positioned along an axis of rotation of said rotating die.

7. A machine in accordance with claim 4, wherein:
said molding means of said first stage withdraws pressurized fluid from said pressure passage means of said die faces in said first stage for deforming the heated plastic sheet around said object form and into said object shape.

8. A machine in accordance with claim 4, wherein:
said removal means of said third stage includes cutting means for cutting said object shape from a remaining portion of the plastic sheet.

9. A machine in accordance with claim 8, wherein:
said cutting means is positioned adjacent said second stage;
said removal means pressurizes said pressure passage means of said die faces after said die faces have past said cutting means.

10. A machine in accordance with claim 1, wherein:
said molding means of said first stage includes a male die positionable opposite said die faces in said first stage, said male die deforming the heated plastic material around said object forms.

11. A machine in accordance with claim 1, wherein:
a lateral pulling chain is used to move the plastic sheet from said first sector, through said second sector and around said rotating die, said lateral chain being positioned along an edge of the plastic sheet and linking with said plurality of die faces of said rotating die.

12. A machine in accordance with claim 11, wherein:
said lateral pulling chain includes teeth means for attaching to the plastic sheet.

13. A machine in accordance with claim 1, wherein:
said rotating die has four die faces mounted on a cubic body, opposite die faces being substantially parallel to each other.

14. A machine in accordance with claim 11, wherein:
said rotating die includes guide means positioned at vertices between said die faces for guiding and linking with said lateral pulling chain.

15. A machine in accordance with claim 14, wherein:
said guide means includes disks with teeth for meshing with said lateral pulling chain.

16. A machine in accordance with claim 11, wherein:
said lateral pulling chain includes elastic tensioning means for tensioning said lateral pulling chain.

17. A machine in accordance with claim 16, wherein:
said elastic tensioning means include ring gears which rotate freely and are fixed in respective bolts linked with expansion springs.

18. A machine in accordance with claim 1, wherein:
said third sector includes positioning and centering means for positioning and centering said rotating die at predetermined angular positions.

19. A machine in accordance with claim 18, wherein:
said positioning and centering means includes rocker arms having an expansion and compression chamber on one end and contact means on another end for contacting one of said plurality of die faces.

* * * * *